United States Patent [19]

Reinsma et al.

[11] 4,422,650
[45] Dec. 27, 1983

[54] FLEXIBLE SEAL ASSEMBLY

[75] Inventors: Harold L. Reinsma, Dunlap; Michael A. Roussin; Albert L. Woody, both of Peoria, all of Ill.

[73] Assignee: Caterpillar Tractor Co., Peoria, Ill.

[21] Appl. No.: 421,172

[22] Filed: Sep. 22, 1982

[51] Int. Cl.³ .............................................. F16J 15/34
[52] U.S. Cl. ...................................... 277/88; 277/84; 277/87
[58] Field of Search ................... 277/152, 153, 25, 88, 277/89, 87, 84, 92

[56] References Cited

U.S. PATENT DOCUMENTS

| | | | |
|---|---|---|---|
| 3,256,027 | 6/1966 | Chapel | 277/25 |
| 3,614,113 | 10/1971 | Burk | 277/94 |
| 3,841,718 | 10/1974 | Reinsma | 305/11 |
| 4,089,531 | 5/1978 | Roley et al. | 277/92 |
| 4,102,538 | 7/1978 | Bertin | 277/153 |
| 4,251,082 | 2/1981 | Little | 277/87 |
| 4,275,890 | 6/1981 | Reinsma | 277/84 |
| 4,278,218 | 7/1981 | Uhrner | 277/88 |
| 4,284,281 | 8/1981 | Reinsma | 277/84 |
| 4,298,079 | 11/1981 | Norlander | 277/88 |

Primary Examiner—Robert I. Smith
Attorney, Agent, or Firm—O. Gordon Pence

[57] ABSTRACT

A flexible seal assembly 10 is provided for a joint 12 having a first member 15 which is both pivotable about and axially movable along an axis 20 relative to a second joint member 16. The seal assembly 10 is disposed within an annular recess 22 of the first joint member 15 and includes an annular seal 30 of a flexible, wear resistant material and a metallic load ring 31. The seal has an axially movable sealing portion 34 with an annular seal lip 38. The load spring 31 is disposed behind the sealing portion 34 for urging and maintaining the seal lip 38 in sealing engagement against a sealing surface 22 of the second joint member 16. A rigid stiffener ring 40 is molded into the sealing portion 34 of the seal 30 and is of a construction and position within the sealing portion 34 to provide the sealing portion with an intervening wall portion 41 of the resilient material of the seal 30 separating the stiffener ring 40 from direct force transmitting contact with the load spring 31 to prevent wear and fretting of the load spring.

21 Claims, 6 Drawing Figures

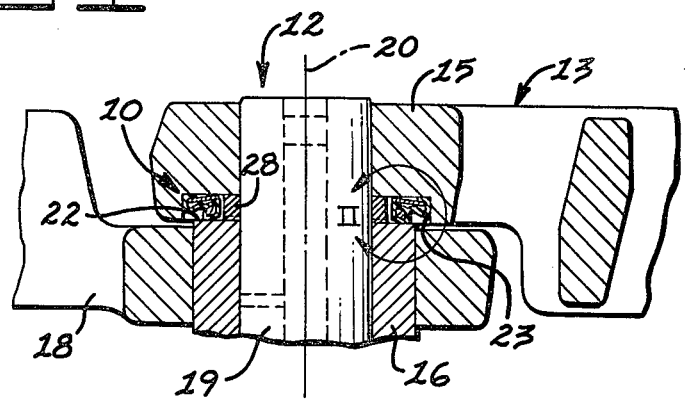
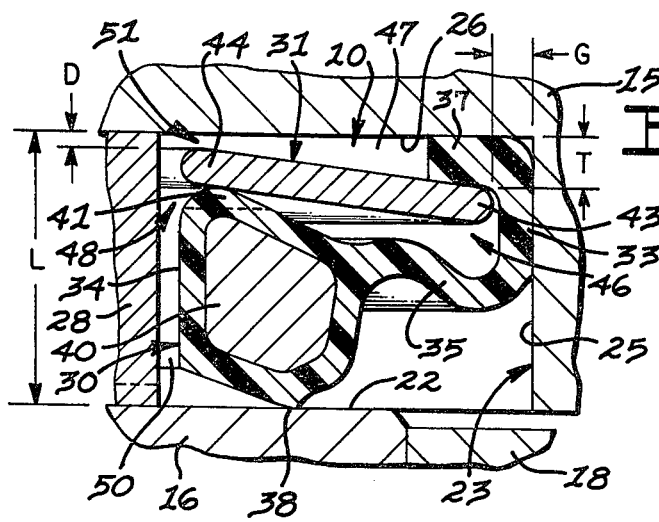
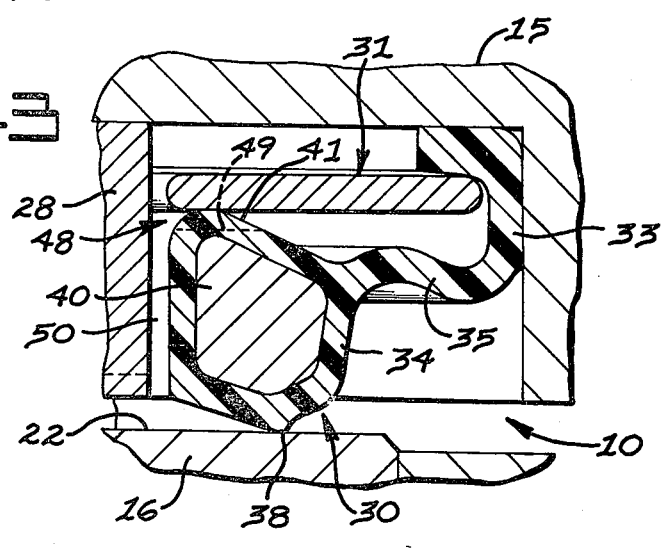

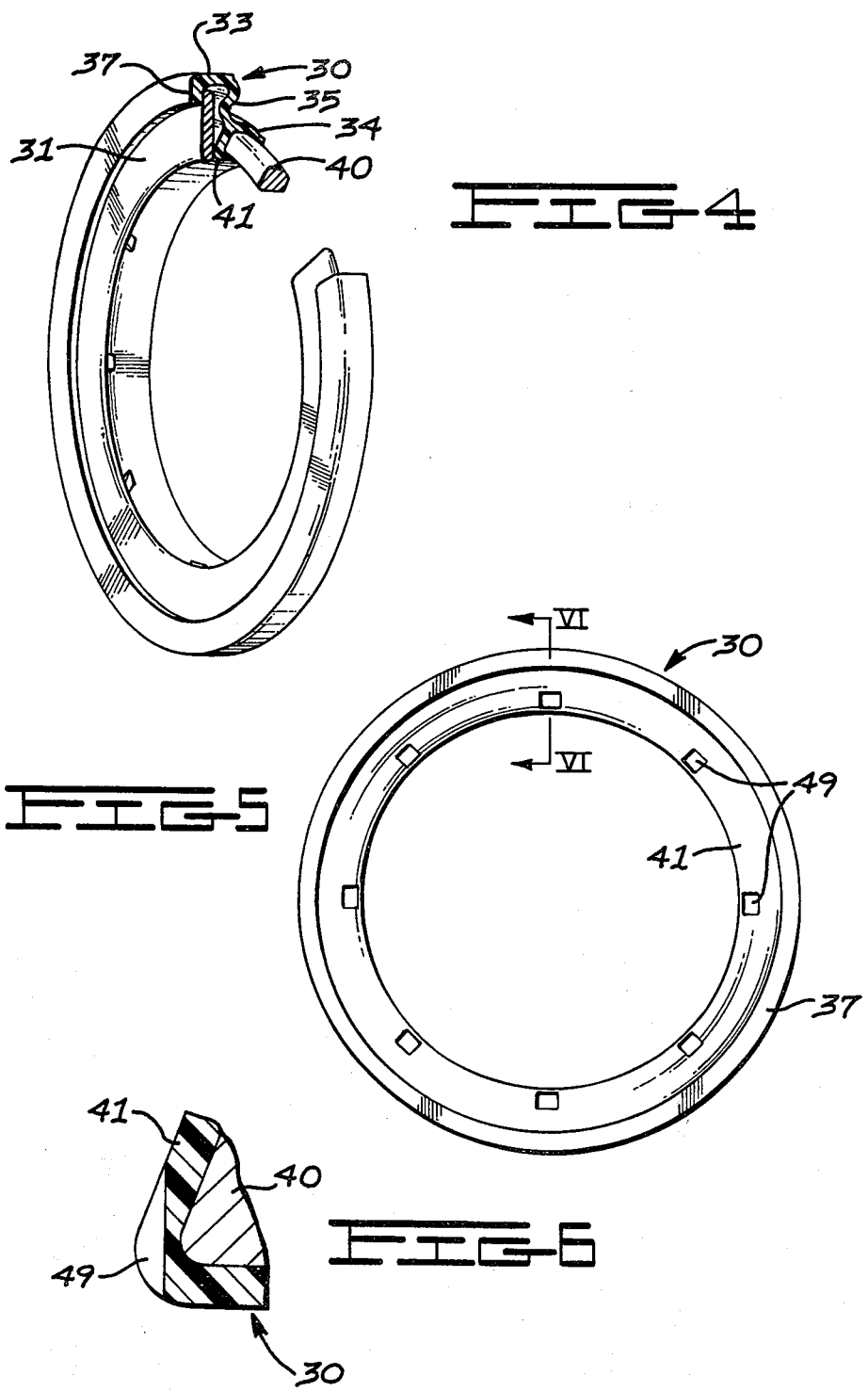

FLEXIBLE SEAL ASSEMBLY

DESCRIPTION

1. Technical Field

This invention relates to seals and in particular to flexible face seals having associated load springs for maintaining rotary sealing engagement against a sealing surface, which surface is also axially movable toward and away from the seal.

2. Background Art

In U.S. Pat. No. 4,275,890 of Harold L. Reinsma, which issued June 30, 1981 and is owned by the assignee hereof, an improved seal is shown for use in sealing a track pin assembly. The seal includes an annular resilient seal which is biased into sealing engagement with one joint member by a frusto-conical spring element acting directly upon a stiffener secured to a portion of the seal.

In U.S. Pat. No. 4,251,082 of William E. Little, which issued Feb. 17, 1981 and is owned by the assignee hereof, a further improved face seal is illustrated for use in sealing a track joint. This seal utilizes an L-shaped force transfer member upon which the load spring acts for mechanically maintaining the transfer member in embracing association with the corner portion of the seal.

A further improved track joint seal is illustrated in U.S. Pat. No. 4,284,281, which issued Aug. 18, 1981 and is owned by the assignee hereof. The seal of this patent shows a box-type annular stiffener against which the load spring acts.

DISCLOSURE OF THE INVENTION

In accordance with one aspect of the invention, a seal assembly is provided for a joint having a first member pivotable about an axis relative to a second member; the first member has an annular recess disposed about the axis and the second member has a sealing surface confronting the recess. The seal assembly is disposed in the recess and includes an annular seal of flexible, wear-resistant material and a metallic load spring; the seal has an axially movable sealing portion with an annular seal lip, and the spring is disposed between the sealing portion for urging and maintaining the seal lip in sealing engagement against the sealing surface. A rigid stiffener ring is molded into the sealing portion of the seal and is of a construction and position within the sealing portion to provide the sealing portion with an intervening wall portion separating the stiffener ring from direct force transmitting contact with the load spring.

Face type seals for joints seal dynamically against a radical face of one joint member as it rotates or oscillates relative to another joint member. Face type seals used in severe service applications, such as in the tracks of track-type vehicles, require relatively high face loads in order to be able to seal the limited supply of oil in and abrasives out of the track joint. In addition, such seals frequently have to accommodate axial movement of the one joint member relative to the other joint member. In a track joint, this axial movement occurs in response to loads imposed on the track in use and is commonly called end play. To accommodate the above requirements, flexible seals have been developed which are loaded by frustoconically shaped metal or Belleville springs.

As the loading forces produced by the Belleville springs are required to be quite high, means for stabilizing the seal lip are desirable to maintain the lip in its proper sealing relationship to its associated sealing surface. In the past, this stabilizing has been accomplished by the use of a metal stiffener member which directly contacted the Belleville spring. However, the aforementioned end play movements of a track causes relative movement between the stiffener ring and the spring. This results in the rubbing of one metal part against another metal part. This rubbing can cause the fretting of the spring which can create sufficient wear that the stresses incurred by the spring will cause it to break. Once broken, the spring no longer applies a required loading force to the seal, resulting in oil loss and premature seal failure.

The construction of the present seal assembly is such that an intervening wall of the resilient seal material is placed between the stiffener and the spring to effectively prevent such fretting, thereby extending the serviceable life of the seal assembly.

In order for the stiffener ring to provide its intended stabilizing of the seal lip, the ring must remain fixed to its associated sealing portion of a seal. This may be accomplished by bonding of the ring to the sealing portion. However, bond failures sometimes occur which allow the seal lip to move out of its proper orientation to the sealing surface, resulting in oil leakage from a joint. Such bond failures frequently initiate along an edge. In the illustrated embodiment, the stiffener ring is advantageously entirely embedded or encapsulated within the sealing portion, thus restricting the exposed edges along which bond failure can initiate.

The sealing assembly of the present invention is thus extremely simple and economical of construction while providing the highly desirable features discussed above.

BRIEF DESCRIPTION OF THE DRAWINGS

FIG. 1 is a fragmentary diametric section of a portion of a track joint showing a seal assembly embodying the present invention.

FIG. 2 is a fragmentary enlarged section of a portion of the assembly illustrated in FIG. 1.

FIG. 3 is a section similar to FIG. 2, but illustrating the arrangement of the seal assembly with the joint members moved axially away from each other as occurs in use.

FIG. 4 is a fragmentary isometric view of the seal assembly as it would appear prior to assembly into the track joint of FIG. 1.

FIG. 5 is a rear elevational view of the seal assembly of FIG. 4, but with the spring removed.

FIG. 6 is an enlarged fragmentary cross sectional view taken along the line VI—VI of FIG. 5.

BEST MODE FOR CARRYING OUT THE INVENTION

In the exemplary embodiment of the invention illustrated in the drawings, a seal assembly embodying the principles of the present invention is generally designated at 10. The seal assembly 10 is for use in a joint 12, such as found in a track 13 of a track-type vehicle, not shown.

Referring to FIG. 1, the track 13 may include a first joint member or link 15 which may comprise one of the links of the track and a second joint member 16 which may illustratively comprise a bushing. The bushing 16 is mounted to a second link 18 of the track 13 and receives a pin 19 for pivotably mounting the second link 18 relative to the first link 15 about an axis 20 of the pin. The bushing has an end face or sealing surface 22 which confronts an annular recess or counterbore 23 formed in the first link 15. The counterbore 23 is disposed concentrically about the axis 20 and, as best shown in FIG. 2, defines a cylindrical sidewall 25 and a radially disposed bottom wall 26.

A thrust ring 28 may be provided between the joint members 15 and 16 for limiting the axial movement of the members toward each other in the normal operation of the track 13. However, the bushing 16 may move back and forth from the position illustrated in FIG. 2 to the position illustrated in FIG. 3. This axial movement of the joint members toward and away from each other occurs frequently and constitutes what is commonly referred to as end play.

Accordingly, the seal assembly 10 not only provides dynamic sealing as the joint members rotate relative to each other, but also maintains this dynamic sealing relationship during this sideways shifting or end play movement between such members.

As best shown in FIGS. 2 and 3, the seal assembly 10 is disposed within the counterbore 23 and includes an annular seal 30 and a frusto-conical load spring 31 for biasing the seal into sealing engagement against the sealing surface 22. The seal 30 includes a radially outer base portion 33, a radially inner sealing portion 34, and a flexible connecting portion 35. The base portion 33 is coaxially received in non-rotative engagement against the sidewall 25 of the counterbore 23 and includes a radially inwardly extending flange 37. The flange 37, which will be hereinafter more fully described, is disposed in abutting relationship against the bottom wall 26 of the counterbore 23.

The sealing portion 34 defines a seal lip 38 which is disposed in sealing engagement against the sealing surface 22 of the bushing 16. The flexible connecting portion 35 extends between and movably connects the sealing portion 34 to the base portion 33. The flexible connecting portion 35 acts in the manner of a corrugated diaphragm to facilitate the axial movement of the sealing portion so that the seal lip 38 can be maintained in sealing engagement against the sealing surface 22 at all times over the range of relative axial movement between the bushing 16 and the link 15.

The seal 30 is preferably formed of a torsionally stiff, resilient material with high abrasion resistance, such as polyurethane. A polyurethane material having a Shore D durometer hardness in the range of approximately 30 to 65 is satisfactory.

The present invention contemplates the use of an improved stiffener ring 40 for stabilizing the seal and maintaining the seal lip 38 in its proper position relative to the sealing surface 22. A stiffener ring is preferably molded into the sealing portion 34 of the seal 30 and is of a construction and position within the sealing portion 34 to provide an intervening wall portion 41 of the sealing portion completely separating the stiffener ring from the spring 31. The stiffener ring 40 is preferably of a high modulus material with a flex modulus of at least 700,000 p.s.i. to provide a high degree of rigidity to the sealing portion. Constructing the stiffener ring of a polycarbonate organic plastic is preferred in that such material can be suitably non-adhesively bonded to the polyurethane material of the seal 30 by a process of molding the polyurethane material of the seal with the polycarbonate stiffener ring in situ in the seal mold. It is also contemplated that the polycarbonate stiffener ring be reinforced with a fiber material, such as glass or the like, to increase its strength and rigidity. A glass reinforced polycarbonate material having a flex modulus of 1,400,000 p.s.i. has been found to be suitable. However, other suitable materials may be used with equal results, such as, for instance, a powdered metal, as well known in the art.

As illustrated in FIGS. 2-4, the stiffener ring 40 is preferably entirely embedded in the sealing portion 34 so as to be completely encapsulated by the polyurethane material of the seal 30. By entirely embedded, it is meant that the stiffener ring be completely encased by the polyurethane material to the extent practically possible, it being understood that a certain number of openings may be required in the polyurethane material to accommodate apparatus for positioning and maintaining the stiffener ring in the mold during the molding process described above. The thickness of the encasing covering surrounding the stiffener ring is preferably kept to a minimum so that as large a cross section as possible for the stiffener ring can be accommodated. For instance, a thickness of from 1 to 2 mm has been utilized in places for the encasing polyurethane material. This provides the greatest amount of surface area between the seal and the stiffener ring so that bonding stresses are minimized and, in conjunction with the elimination of bond edges, the possibility of bond failure is likewise minimized.

The frusto-conical load spring 31 has an outer end portion 43 engaged against the flange 37 and an inner end portion 44 engaged against the intervening wall 41 of the sealing portion 34. As is visible in the drawings, the spring 31 separates the annular space between the counterbore 23 and the seal 30 into a first cavity 46 and a second cavity 47, either of which may fill with oil used to lubricate the joint.

Means 48 for venting oil from such cavities 46 and 47 are provided to prevent injurious pressure build up from the pumping action caused by the aforementioned end play movement. Such venting means 48 may include a radially extending groove 49 provided in the intervening wall portion 41 and communicating the first cavity 46 with an oil reservoir, a portion of which is shown at 50 in FIG. 2. As best shown in FIGS. 5 and 6, a plurality of such grooves 49 may be provided in an equi-angularly spaced relation about the circumference of the wall portion 41.

The venting means 48 also include a continuous oil passage 51 disposed between the inner end portion 44 of the load spring 31 and the bottom wall 26 of the recess 23 and communicating the oil reservoir 50 with the second cavity 47. This is preferably accomplished by providing the thrust ring 28 with a predetermined length L which is effective in controlling the amount of movement of the load spring 31 past its over center position such that, in the fully compressed condition depicted in FIG. 2, the inner end portion 44 of the spring 31 is spaced a predetermined minimum distance D from the bottom wall 26 of the counterbore 23.

The load spring 31 has an outer diametral dimension which is less than the inner diametral dimension of the counterbore 23, thereby defining a radial gap G therebetween. The flange 37 of the outer base portion 33 of the seal 30 has a predetermined thickness T which is preferably greater than the radial gap G. The greater thickness T of the flange is also effective in increasing the amount of movement of load spring 31 past its over center position while maintaining the predetermined distance D between the spring 31 and the counterbore 23.

Industrial Applicability

The seal assembly 10 of the present invention is advantageously adapted for use in a wide range of applications where axial and rotational movement occur between two members in the presence of abrasive materials in addition to the track joint embodiment discussed above, as will be obvious to those skilled in the art.

The improved seal assembly comprehends the use of a stiffener ring for stabilizing the seal lip of the seal, but with the stiffener ring being separated from direct contact with the load spring by an intervening wall portion 41 of the resilient material of the seal itself. This wall is effective in preventing wear and fretting of the steel load spring 31.

By completely embedding the stiffener ring 40 in the sealing portion 34, external bond edges between the stiffener ring and the seal material where bond separation may initiate are restricted. Likewise, by keeping the wall thickness of the seal material surrounding the stiffener ring 40 to a minimum, the cross section of the stiffener ring can be maximized. Thus, the stresses in the bond between the seal material and the stiffener ring can be reduced by providing a greater surface area on the stiffener ring to which the seal material is bonded.

The greater thickness of the flange 37 of the base portion 33 is effective in preventing the inadvertent escape of the flange from around the spring 31 once the seal assembly 10 is mounted within the counterbore 23.

Thus, it is apparent from the foregoing that the structure of the improved seal assembly 10 assures good sealing by the seal over an extended service life, with minimum chance of premature failure of any of the components thereof.

Other aspects, objects and advantages of this invention can be obtained from a study of the drawings, the disclosure and the appended claims.

What is claimed is:

1. In a face seal assembly (10) for a joint (12) having a first member (15) pivotable about an axis (20) relative to a second member (16), the first member (15) having an annular recess (23) disposed about said axis (20) and the second member (16) having a sealing surface (22) confronting said recess (23), said seal assembly (10) being disposed in said recess (23) and including an annular seal (30) of flexible, wear resistant material and a metallic load spring (31), said seal (30) having an axially movable sealing portion (34) with an annular seal lip (38), and said spring (31) being disposed behind said sealing portion (34) and exerting a force for urging and maintaining said seal lip (38) in sealing engagement against said sealing surface (22), the improvement comprising:

a rigid stiffener ring (40) molded into said sealing portion (34) of said seal (30), said stiffener ring (40) being of a construction and position within said sealing portion (34) sufficient for providing the sealing portion (34) with an intervening wall portion (41) separating the stiffener ring (40) from direct force transmitting contact with and from rubbing against the load spring (31) in response to axial movement of said sealing portion (34).

2. The seal assembly (10) of claim 1 wherein said stiffener ring (40) is substantially entirely embedded within said sealing portion (34) of said seal (30).

3. The seal assembly (10) of claim 2 wherein said stiffener ring (40) is formed of a material having a flex modulus of at least 700,000 p.s.i.

4. The seal assembly (10) of claim 2 wherein said stiffener ring (40) is formed of a polycarbonate material.

5. The seal assembly (10) of claim 4 wherein said polycarbonate material of said stiffener ring (40) is fiber reinforced.

6. The seal assembly (10) of claim 2 wherein said stiffener ring (40) is formed of a powdered metal.

7. The seal assembly (10) of claim 2 wherein said stiffener ring (40) has predetermined inner and outer diameters and said seal lip (38) has a diametral dimension intermediate said inner and outer diameters of said stiffener ring (40).

8. The seal assembly (10) of claim 2 including means (48) for venting oil from between said seal (30) and said recess (23).

9. The seal assembly (10) of claim 8 wherein said joint (12) includes an oil reservoir (50), a first cavity (46) is defined between said load spring (31) and said seal (30), said load spring (31) has an inner end portion (44) engageable against said wall portion (41) of the sealing portion (34), and said venting means (48) includes at least one radial groove (49) formed in said wall portion (41) of the sealing portion (34) and communicating said first cavity (46) with said oil reservoir (50).

10. The seal assembly (10) of claim 9 wherein said recess (23) has a bottom wall (26), a second cavity (47) is defined between said load spring (31) and said recess (23), and said venting means (48) includes a continuous oil passage (51) between said inner end portion (44) of the load spring (31) and the bottom wall (26) of the recess (23) and communicating said second cavity (47) with the oil reservoir (50).

11. The seal assembly (10) of claim 4 wherein said seal (30) includes a radially outer base portion (33) non-rotatably engaged against said recess (23) and a flexible connecting portion (35) extending from and axially movably connecting said sealing portion (34) to said base portion (33).

12. The seal assembly (10) of claim 11 wherein said recess (23) has a predetermined inner diametral dimension and said load spring (31) has a predetermined outer diametral dimension less than said inner dimension of said recess (23) and defines a radial gap (G) therebetween and said base portion (33) includes a radially inwardly extending flange (37) adjacent said load spring (31), said flange portion (37) being of a thickness (T) greater than said radial gap (G).

13. In a face seal assembly (10) of a joint (12) having a first member (15) and a second member (16) rotatably about and axially moveable along an axis (20) relative to each other, the first member (15) having an annular recess (23) disposed about said axis (20) defining a bottom wall (26) and a sidewall (25), and the second member (16) having a sealing surface (22) confronting said recess (23), said seal assembly (10) having an annular seal (30) and a frusto-conical load spring (31) disposed within said recess (23), said seal (30) having a radially outer base portion (33), a radially inner sealing portion (34) and a flexible connection portion (35), said base portion (33) being non-rotatably engaged against said sidewall (25) and said bottom wall (26) of said recess (23), said sealing portion (34) having a seal lip (38) positionable against said sealing surface (22) of said second member (16) and said flexible connecting portion (35) extending between and movably connecting said sealing portion (34) to said base portion (33) to free said sealing portion (34) for axial movement with said second member (16), the improvement comprising:

a rigid stiffener ring (40) substantially entirely embedded within said sealing portion (34), said stiffener ring (40) being of a construction and position within said sealing portion (34) sufficient for providing the sealing portion (34) with an intervening wall portion (41) separating the stiffener ring (40) from direct force transmitting contact with and rubbing contact against said load spring (31) in response to axial movement of said sealing portion (34).

14. The seal assembly (10) of claim 13 wherein said stiffener ring (40) is formed of an organic polycarbonate material.

15. The seal assembly (10) of claim 14 wherein said polycarbonate material of said stiffener ring (40) is glass reinforced.

16. The seal assembly (10) of claim 13 wherein said stiffener ring (40) is formed of a powdered metal.

17. The seal assembly (10) of claim 13 wherein said stiffener ring (40) has predetermined inner and outer diameters and said seal lip (38) has a diametral dimension intermediate said inner and outer diameters of said stiffener ring (40).

18. The seal assembly (10) of claim 13 wherein said frusto-conical spring (31) has an inner end portion (44) engageable against said wall portion (41) of said sealing portion (34) defining a first cavity (46) between said seal (30) and said spring (31) and said seal assembly includes means (48) for venting oil from said first cavity (46).

19. The seal assembly (10) of claim 18 wherein said venting means (48) includes at least one radial groove (49) formed in said wall portion (41) of the sealing portion (39) of said seal (30).

20. The seal assembly (10) of claim 19 wherein said venting means (48) includes means for maintaining predetermined minimum distance (D) between said bottom wall (26) of the recess (23) and the inner end portion (44) of the spring (31).

21. The seal assembly (10) of claim 13 wherein said sidewall (25) of the recess (23) has a predetermined inner diametral dimension and said load spring (31) has a predetermined outer diametral dimension less than said inner dimension of said recess (23) and defines a radial gap (G) therebetween, and said base portion (33) of the seal (30) has a radially inwardly extending flange (37) adjacent the bottom wall (26) of the recess (23), said flange (37) being of a thickness (T) greater than the radial gap (G) between said outer dimension of said spring (31) and the inner dimension of said sidewall (25) of the recess (23).

* * * * *